Sept. 11, 1956     L. J. REDARD     2,762,210
UNIVERSAL JOINT
Filed Aug. 13, 1954
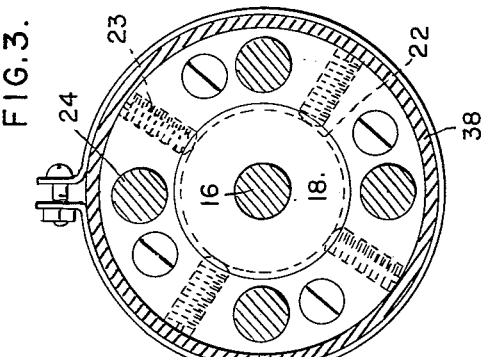
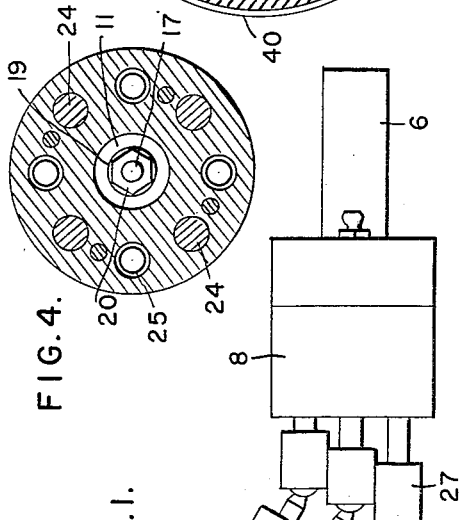
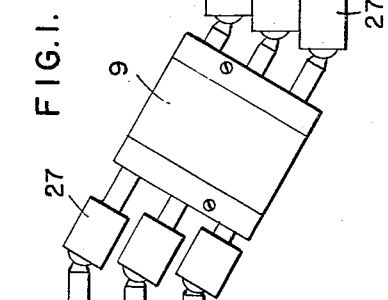
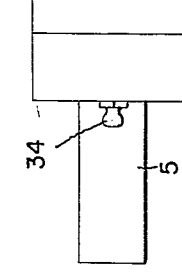
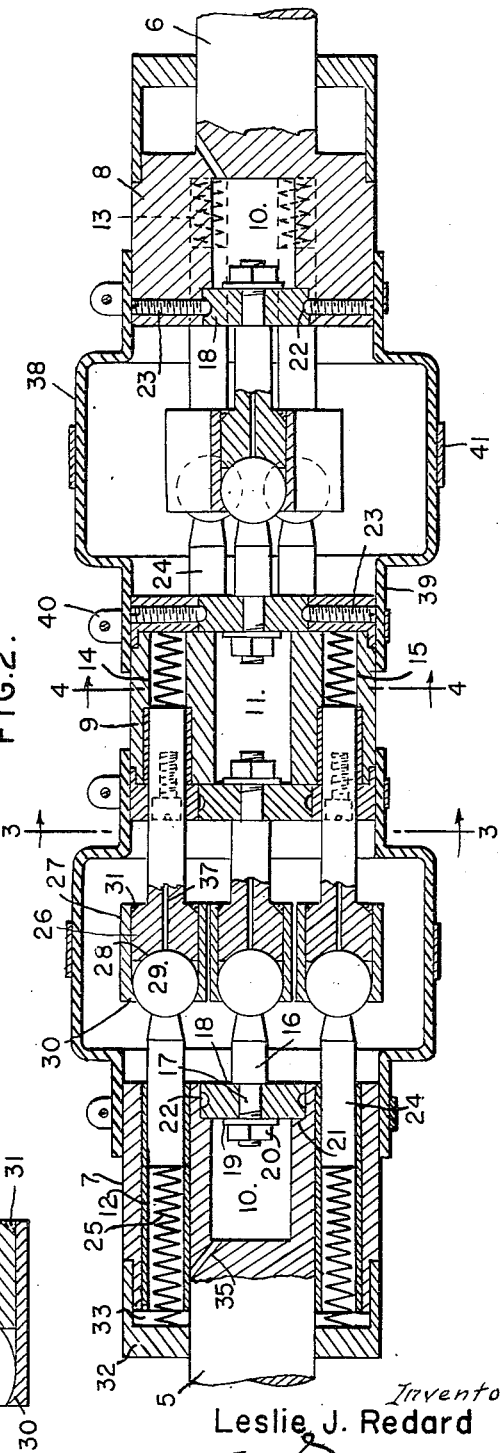
Inventor
Leslie J. Redard
By [signature]
ATTY.

United States Patent Office 2,762,210
Patented Sept. 11, 1956

2,762,210

UNIVERSAL JOINT

Leslie J. Redard, Peoria, Ill., assignor to Flexi-Versal Corporation, Peoria, Ill.

Application August 13, 1954, Serial No. 449,588

2 Claims. (Cl. 64—20)

This invention relates to universal joints, and is an improvement on the Right Angle Flexible Power Coupling of my application, Serial Number 421,337, filed April 6, 1954, and on the Universal Joint of application, Serial Number 268,830 of John P. Kitselman, filed January 29, 1952, which applications and inventions are in common ownership with my application and invention herein. While the devices of said applications represent advances in the art, experiment has shown that optimum torque strength and load capacity of the ball and socket joint thereof is not available because of the structural design of the socket which requires a die-formed union of the ball and socket, a portion of the latter being soft for crimping over the mating ball member. This weakened joint reduces the number of applications for which the unit may be employed and shortens its life. Also, even though the Kitselman unit is capable of transmitting motion from one shaft to another, over a wide angular range, it cannot effect parallel shafting, i. e. the transmission of motion from one shaft to another parallelly arranged shaft.

It is an object of this invention therefore, to provide a universal joint including an improved ball and socket structure which produces increased torque strength and load capacity as power transmission to parallel shafting.

Another object is to provide a three-member, double jointed coupling of the character described, capable of transmitting rotary motion from one shaft to another, when the shafts are coaxial or at an angle to one another, up to a ninety degree differential in any direction, the coupling also being adaptable to effect parallel shafting of the two shafts.

A further object is to provide a universal joint which will accomplish the above objects and facilitate and expedite manufacture.

Other objects of the invention will be manifest from the following description of the present preferred form of the invention, taken in connection with the accompanying drawing, wherein:

Fig. 1 is a plan view of the universal joint of the present invention, the joint being shown in position to effect parallel shafting;

Fig. 2 is a longitudinal sectional view of the universal joint;

Fig. 3 is a sectional view taken along the line 3—3 of Fig. 2, looking in the direction of the arrows;

Fig. 4 is a sectional view taken along the line 4—4 of Fig. 2, looking in the direction of the arrows; and Fig. 5 is a sectional view of the socket forming a part of the present invention.

Referring now in greater detail to the drawings, 5 and 6 designate two similar shafts having enlarged cylindrical head portions 7 and 8 respectively, intermediate which head portions is a cylindrical rod housing 9.

Head portions 7 and 8 are provided with central bores 10 which are coaxial with a central bore 11 of rod housing 9. Head portions 7 and 8 also have a plurality of circumferentially spaced openings 12 and 13 respectively, parallel to the axes of shafts 5 and 6. Rod housing 9 is provided with a plurality of circumferentially spaced openings 14, which are coaxial with and face the openings 13 of head portion 8.

Axial bores 10 of head portions 7 and 8 and axial bore 11 of rod housing 9 each have the inner end of a relatively short rod 16 secured therein. Rod 16 is reduced at 17 to receive a disc 18 which is retained by a washer 19 and a nut 20, reduced end 17 being threaded to receive said nut. Each disc 18 abuts against shoulder 21 of members 7, 8 and 9, so that the outer face of the disc lies flush with the outer face of members 7, 8 and 9. Disc 18 is provided with a central peripheral groove 22 adapted for the reception of setscrews 23 which hold the disc securely in place.

Circumferential bores 12, 13, 14 and 15 have rods 24 of greater length than rod 16 slidably disposed therein. Compressed coil springs 25 positioned between rods 24 and the walls of housing 7, 8 and 9, tension opposing rods 24 towards each other. As shown to advantage in Fig. 2, rods 16 and 24 extending from housing 9 and head portion 8 are enlarged at their outer end as indicated at 26 for insertion in a hollowed out cylindrical shaped socket 27. The terminal face of enlarged extension 26 is concave as shown at 28 to complement the contour of a ball 29 which is secured to the outer ends of rods 16 and 24 opposed to sockets 27. The side walls of socket 27 are internally thickened at the ball-receiving end thereof, as indicated at 30 to prevent egress of ball 29. Longitudinal movement of ball 29 with respect to socket 27 is prevented by extension 26 which is welded or secured by other suitable means 31 to socket 27.

This design of the ball and socket permits the latter to be precision machined and heat treated to effect a hardened wearing surface. Such case hardening is not possible with a die-formed union. The present socket assembly results in a stronger unit which in turn, effects increased loadability capacity and longer life of the joint. This improvement also permits mating parts to be ground and fitted to close tolerances for maximum service safety and minimum backlash. The better fit and hardened wearing surface result in positive and smooth movements of the shafts in transmitting load from the driving to the driven member.

Head portions 7 and 8 are each provided at their shaft end with a cap 32 which forms a lubricant reservoir 33 between the outer terminal thereof and head portion 7 or 8. In communication with reservoir 33 is a grease fitting 34. For lubricating the moving parts of the universal joint, a lubricating duct 35 extends from reservoir 33 to central bore 10 and lubricating ducts leading from reservoir 33 communicate with circumferential bores 12 and 13. Sockets 28 are lubricated by lubricating ducts 37 extending to the ball engaging surface thereof, through rods 16 and 24 and enlarged extensions 26. In order to effect lubrication of the external surfaces of the ball and socket members between head portion 7 and rod housing 9 and between head portion 8 and rod housing 9, there is provided at each of these points, a cylindrical lubricant chamber 38, the terminals of which are flanged at 39 for engagement with the outer peripheral walls of members 7, 8 and 9. Chambers 38 are constructed of any suitable flexible material such as rubber. Retaining rings 40, engaged with flanges 39 hold chambers 38 against longitudinal movement. The central outer periphery of chamber 38 is provided with a metallic band 41 to prevent bulging of the flexible chamber upon rotation of the universal joint.

The universal joint of the present invention may be used to effect an angular drive of ninety degrees by deflection of each of rod housing 9 and head portion 8 forty-five degrees in the same direction. By manipulation of these two units, all angles between zero and ninety degrees, in any direction, is effected between shafts 5 and 6. As shown to advantage in Fig. 1, the present device is equally applicable for effecting parallel shafting of shafts 5 and 6 by disposing rod housing 9 at a forty-five degree angle to head portions 7 and 8.

It is to be understood that various changes may be made within the scope of the claims hereto appended.

What I claim is:

1. In a universal joint, a pair of shaft ends having a plurality of spaced bores, a housing interposed between said shaft ends, having a plurality of spaced bores, aligned with the bores of said shaft ends, reciprocating rods extending from each of the spaced bores, fixed means for holding the shaft ends and housing together, and universal connections between the pairs of rods in corresponding spaced bores.

2. In a universal joint, a pair of shaft ends each having an axial bore and a plurality of circumferentially spaced bores, a housing interposed between said shaft ends having an axial bore and a plurality of circumferentially spaced bores, fixed rods extending from the axial bores of said shaft ends to fixed rods extending from the axial bores of said intermediate housing, ball and socket connections between the fixed rods, reciprocating rods extending from each of the circumferentially spaced bores, and ball and socket connections between the pairs of rods in corresponding circumferentially spaced bores.

References Cited in the file of this patent

UNITED STATES PATENTS

| | | |
|---|---|---|
| 1,334,388 | Masse | Mar. 23, 1920 |
| 2,022,909 | Glen | Dec. 3, 1935 |
| 2,261,254 | Humphrey | Nov. 4, 1941 |
| 2,378,851 | Ibbott | June 19, 1945 |